Figures 1, 2, 3:
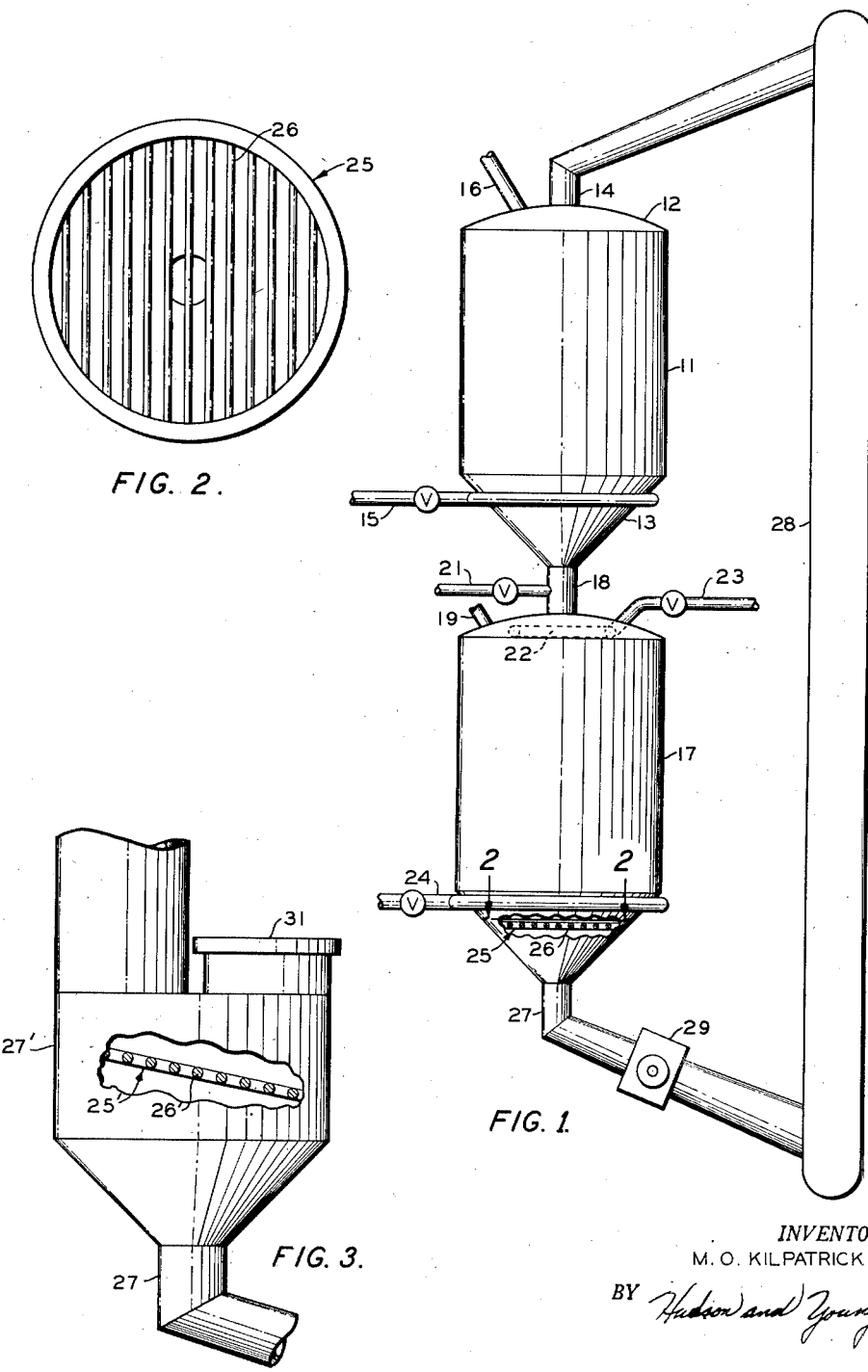

Jan. 11, 1955  M. O. KILPATRICK  2,699,380
PEBBLE HEATER FOR CONVERTING HYDROCARBONS
Filed July 10, 1950

INVENTOR.
M. O. KILPATRICK
BY
ATTORNEYS

United States Patent Office 2,699,380
Patented Jan. 11, 1955

2,699,380

PEBBLE HEATER FOR CONVERTING HYDROCARBONS

Myron O. Kilpatrick, Bartlesville, Okla., assignor to Phillips Petroleum Company, a corporation of Delaware Application July 10, 1950, Serial No. 172,987

2 Claims. (Cl. 23—284)

This invention relates to pebble heater apparatus. In one of its more specific aspects, it relates to the conversion of petroleum hydrocarbons. In another of its more specific aspects, it relates to means for preventing choking of solid material conduits and solid material elevator means with large coke aggregates. In another of its more specific aspects it relates to an improved method for removing large coke aggregates from a pebble heater system.

Thermal conversion processes which are carried out in so-called pebble heater apparatus utilize a fluent mass of solid heat exchange material, which mass is ordinarily heated to a high temperature by passing hot gas therethrough in a first direct heat exchange step, and is then caused to contact fluid reactant materials, furnishing heat thereto in a second direct heat exchange. In the conversion of petroleum hydrocarbons in pebble heater apparatus, when reaction products are removed from the upper portion of the reaction chamber at a point which is not maintained in constant contact with abrading solid contact materials, considerable coke deposit is encountered on the reaction chamber. As this coke deposit builds up, it finally reaches such a degree that large chunks of the coke break loose from the surface of the reaction chamber top and fall into the fluent mass of solid heat exchange material and are gravitated through the reaction chamber, together with the solid heat exchange material. These large coke aggregates tend to become lodged in the solid material outlet conduits from the reaction chamber or in the elevator for raising the solid heat exchange material to a heating chamber for the solid heat exchange material. Such malfunction of the pebble heater apparatus results in considerable loss in operating time and often results in considerable destruction of equipment.

Broadly speaking, this invention comprises a means and method for converting petroleum hydrocarbons and for removing any coke aggregates which may become entrained in the gravitating solid heat exchange material mass. The means by which coke is prevented from choking vital points of the pebble heater apparatus is a bar type grill which is provided either within the lower end of the reaction chamber immediately above the solid material outlet conduit or within an enlarged portion of the solid material outlet conduit above an outlet conduit portion of reduced diameter. The method of converting petroleum hydrocarbons has the improvement of concomitant reduction of large coke aggregates by the abrasive action of solid heat exchange material on the coke.

Conventional pebble heater chambers of pebble heater apparatus are generally formed as cylinders in which a solid heat exchange material is collected in the form of a gravitating bed. Hot heat exchange gases are passed upwardly through the gravitating solid material bed, sometimes being introduced thereinto at the periphery of the bed and at its lower end, and sometimes through a refractory arch which supports the moving solid material bed. At other times heat is supplied to the heating chamber by supplying a fuel to the lower portion of the solid material bed within the heater chamber and burning the fuel on the surface of the solid material so as to heat the pebbles by combustion and further heat the solid material by passing the resulting combustion gas upwardly through the gravitating fluent mass of solid heat exchange material and in direct heat exchange therewith.

The heated solid heat exchange material is introduced into the upper portion of a reaction chamber and the reactant materials are introduced as a fluid stream directly into contact with the hot solid heat exchange material from the solid material heater chamber. When gaseous reactant material, such as ethane or propane, are utilized they are introduced into the lower portion of the reaction chamber and are caused to pass countercurrent to the gravitating flow of solid heat exchange material within the reaction chamber. When the reactant materials are liquid hydrocarbons, such as heavy petroleum oil which may have an A. P. I. gravity within the range of 10 to 25, the reactant materials are generally introduced into the upper portion of the reaction chamber and are caused to flow downwardly concurrent with the flow of gravitating solid heat exchange material. Reaction products are removed in a gaseous phase at the upper portion of the reaction chamber. Under almost all operating conditions the gaseous reaction products contact the surface of the reaction chamber for a sufficient length of time to allow a portion of the products to become converted to coke within and on the reaction chamber.

Solid heat exchange material which is conventionally used in pebble heater apparatus is generally called "pebbles." The term "pebbles" as used herein denotes any solid refractory material of flowable size and form, having strength which is suitable to carry large amounts of heat from the pebble heating chamber to the reaction chamber without rapid deterioration or substantial breaking. Pebbles which are satisfactorily used in pebble heater apparatus are ordinarily substantially spherical in shape and range from about ⅛ inch to about 1 inch in diameter. In high temperature processes, pebbles having a diameter of between about ⅛ inch and ½ inch are preferred. The pebbles must be formed of a refractory material which will withstand temperatures at least as high as the highest temperature attained in the pebble heater chamber. The pebbles must also be capable of withstanding temperature changes within the apparatus. Refractory materials, such as alloys, ceramics, or other satisfactory material, may be utilized to form such pebbles. Silicon carbide, alumina, periclase, thoria, beryllia, stellite, zirconia, and mullite may be satisfactorily used to form such heat transfer pebbles or may be used in admixture with each other or with other materials. Alumina-mullite and mullite-alumina pebbles have proved to be quite satisfactory when properly fired for service in high temperature operations. Some pebbles, such as mullite-alumina pebbles, withstand temperatures as high as 3200° F. and above.

An object of this invention is to provide an improved pebble heater apparatus. Another object of the invention is to provide improved means for preventing the choking of pebble conduits or elevator means by large coke aggregates. Another object of the invention is to provide a method for expeditiously removing coke aggregates from the pebble heater system. Another object of the invention is to provide an improved means for removing coke aggregates from the pebble heater system. Other and further objects and advantages will be apparent to those skilled in the art upon study of the accompanying discussion and the drawings.

Understanding of the invention will be facilitated upon reference to the drawings in which Figure 1 is a diagrammatic elevation, partially in section, of the pebble heater apparatus of this invention. Figure 2 is an enlarged horizontal cross-section taken along the line 2—2 of Figure 1. Figure 3 is a preferred modification of a pebble outlet means for the pebble heater apparatus of this invention.

Referring specifically to Figure 1 of the drawings, upright pebble heater chamber 11 is elongated and closed at its upper and lower ends by closure members 12 and 13, respectively. Pebble inlet conduit 14 is provided in the upper portion of pebble heater chamber 11 and is preferably centrally positioned in closure member 12. Heating material inlet conduit 15 extends from a heating material supply source, not shown, to the lower portion of pebble heater chamber 11 and preferably extends at least a portion of the distance around the lower portion of that chamber. Conduit 15 communicates with the interior of chamber 11 through the lower wall portion of that chamber. Gaseous outlet conduit 16 is provided in the upper end portion of chamber 11.

Reaction chamber 17, which is also elongated and disposed in an upright position, is provided below chamber 11 and pebble conduit 18 extends between the lower portion of chamber 11 and the upper portion of chamber 17. Gaseous effluent outlet conduit 19 is provided in the upper portion of chamber 17. Gaseous material inlet conduit 21 is provided so as to extend into pebble conduit 18 so as to provide a source of an inert gas, such as steam, to prevent the flow of gaseous reaction products, fuel, or reactant materials between chambers 11 and 17. Reactant material inlet header 22 is provided in the upper portion of chamber 17 so as to provide inlet means in the reaction chamber for liquid reactant materials, such as heavy hydrocarbon oils. Reactant material inlet conduit 23 extends between inlet header 22 and a reactant material supply source, not shown. Reactant material inlet conduit 24 is provided adjacent the lower portion of chamber 17, preferably extending at least a portion of the distance around the lower end of chamber 17 and communicating with the interior of chamber 17 through the lower wall.

A sifter 25, such as a bar grill or screen which is shown in cross-section in Figure 1, is preferably formed of stainless steel bars, such as 18—18 or 25—20 steel. The specific structure of this sifter will be more apparent upon reference to Figure 2 of the drawings. Rods 26 are spaced apart a distance of between 5 and 14 diameters of the pebbles utilized within the pebble heater apparatus. The preferred form of this sifter utilizes the bars in a spaced-apart position between 7 and 11 pebble diameters apart. The distance between the bars of the grill is ordinarily fixed so that it will be considerably less than the diameter of the pebble outlet in the bottom of the reaction chamber.

Pebble outlet conduit 27 extends from the lower portion of chamber 17 and is connected at its lower end to the lower end portion of elevator 28. Elevator 28 is connected at its upper end portion to the upper end of pebble inlet conduit 14. A pebble flow control device 29, which may be a rotating table feeder, a vibrating feed screen, or a conventional star valve, is provided intermediate the ends of conduit 27 so as to regulate solid material flow through the pebble heater apparatus.

A modification of pebble outlet conduit 27 is found in enlarged form in Figure 3 of the drawings as conduit 27'. Conduit 27' is considerably larger than conduit 27, being preferably more than twice the diameter of the inlet end of that conduit. Pebble conduit 27 extends downwardly and laterally from the lower end portion of the modified conduit 27' to elevator 28, not shown in this figure. A sifter 25', similar to that shown in Figure 2 of the drawings, is provided within conduit portion 27' and is positioned at an angle of between 10° and 18° from the horizontal, preferably between 12° and 15° from the horizontal. In its preferred form as shown by Figure 3 of the drawings, conduit portion 27' is formed as an eccentric, with the inlet thereto being positioned adjacent one side of the larger conduit portion. Sifter 25' extends downwardly from the wall of conduit portion 27' to the wall disposed the greatest distance from the inlet to that conduit portion. A coke outlet port which is closed by cap 31 is provided adjacent the side of conduit portion 27' at which the lower side of the sifter terminates.

In the operation of the device shown as Figure 1 of the drawings, gaseous heat exchange material which may be in the form of hot combustion gases or which may be air and fuel which is burned on the surface of the pebbles, is introduced into the lower portion of pebble heater chamber 11. The hot gaseous heat exchange material passes upwardly through the gravitating bed of pebbles within pebble heater chamber 11 in direct heat exchange therewith, raising the temperature of those pebbles to a temperature within the range of between 1800° F. and 2600° F., depending upon the reaction to be carried out within reaction chamber 17. The pebbles which are heated in this manner are gravitated through conduit 18 and form a contiguous fluent mass within reaction chamber 17. When gaseous reactant materials are utilized, those reactant materials are introduced into the lower portion of chamber 17 through inlet conduit 24. The reactant materials flow upwardly through the contiguous mass of pebbles counter to the gravitating flow of the pebbles therein. The reactant materials are raised to reaction temperature during the contact with the hot pebbles and finally escape from contact with the pebbles in the upper portion of the reaction chamber. The reaction products are removed from the reaction chamber through gaseous effluent outlet conduit 19, but before removal from chamber 17 a considerable amount of reaction products contacts the inner surface of the top of that chamber and forms a coke deposit thereon.

Much the same result is obtained upon introduction of liquid hydrocarbon oil into contact with the hot pebbles by introducing the oil into chamber 17 through inlet header 22. The liquid oil is dispersed over the surface of the hot pebbles and is raised to reaction temperature by contact therewith as the pebbles and oil gravitate concurrently through reaction chamber 17. As the oil is vaporized and converted to gaseous products, the vapors and gaseous products rise through the pebble bed counter to the gravitating flow thereof and are removed from the upper portion of chamber 17 through gaseous effluent outlet conduit 19. These gaseous and vaporous hydrocarbon materials also contact the inner surface of the top of reaction chamber 17 and a considerable coke deposit on the inner surface of the chamber top results therefrom.

Pebbles which are cooled in the reaction of hydrocarbons within chamber 17 are gravitated from the bottom of that chamber through pebble conduit 27 in response to the control of pebble feeder 29. The pebbles are elevated to the upper portion of pebble heater chamber 11 by means of elevator 28. As the coke deposit on the inner surface of the top of reaction chamber 17 builds up to such an extent that large chunks break away therefrom and fall into the gravitating pebble mass, that coke material gravitates downwardly through chamber 17, together with the pebbles. If the coke material is of such size that it would tend to choke the pebble outlet conduit or the pebble elevator, it is prevented from gravitating into the pebble outlet conduit by the operation of the sifter member 25 which is provided in the lower portion of chamber 17. The coke aggregates are maintained on the top of the grill member while the pebbles gravitate over the surface thereof, abrading the coke aggregates to such an extent that is is eventually worn down to such a size that its flow through the pebble heater system would not choke the pebble conduits or the pebble elevator. By the device of this invention, therefore, it will be seen that coke is automatically reduced to such a size that its presence in the pebble heater device does not adversely affect the operation of the pebble heater system.

When the modification shown in Figure 3 of the drawings is utilized in connection with the system shown in Figure 1 of the drawings, pebble and coke flow is obtained in much the same manner as described in connection with the operation of the device of Figure 1. Coke aggregate which gravitates through reaction chamber 17 is caught on sifter member 25' and as the pebbles flow thereover and abrade the coke, the flow of pebbles is such as to cause the coke to be pushed to the lower end of the grill member. If the coke builds up on the sifter member 25' to such an extent that it reduces the efficiency of operation of the pebble heater apparatus, the coke is very easily removed in a short period of time by taking the pebble heater device off stream and removing the accumulation of coke through the coke outlet port after removing cap 31 therefrom.

Many modifications will be apparent to those skilled in the art upon study of the accompanying disclosure and the drawings. It is believed that such modifications are clearly within the spirit and the scope of this disclosure.

I claim:

1. An improved pebble heater apparatus which comprises in combination a first upright elongated closed chamber; pebble inlet conduit means in the upper portion of said first chamber; gaseous effluent outlet conduit means in the upper portion of said first chamber; heating material inlet means in the lower portion of said first chamber; a second upright elongated closed chamber below said first chamber; pebble conduit means extending between the lower end of said first chamber and the upper end of said second chamber; gaseous effluent outlet conduit means in one end portion of said second chamber; reactant material inlet means in the end of said second chamber opposite said gaseous effluent outlet conduit; a pebble outlet conduit in the lower end portion of said second chamber, the upper portion of said pebble outlet conduit opening into the top of an enlarged conduit section of said pebble outlet conduit; a sifter, positioned in said enlarged portion of said pebble conduit, comprising a plurality of parallel bars spaced apart so as to permit free flow of pebbles therethrough while preventing flow of large chunks of solid material therethrough, said sifter being disposed at an angle of between 10° and 18° from the horizontal, extending downwardly and in a direction away from the pebble outlet conduit portion which opens into the top of said enlarged conduit section; a coke port in the upper portion of said enlarged conduit section at the side toward which said sifter extends downwardly; and an elevator connected to said pebble outlet conduit, downstream of said sifter, and to said pebble inlet means to said first chamber.

2. An improved pebble heater apparatus which comprises in combination a first upright elongated closed chamber; pebble inlet conduit means in the upper portion of said first chamber; gaseous effluent outlet conduit means in the upper portion of said first chamber; heating material inlet means in the lower portion of said first chamber; a second upright elongated closed chamber below said first chamber; pebble conduit means extending between the lower end of said first chamber and the upper end of said second chamber; gaseous effluent outlet conduit means in one end portion of said second chamber; reactant material inlet means in the end of said second chamber opposite said gaseous effluent outlet conduit; a pebble outlet conduit in the lower end portion of said second chamber, the upper portion of said pebble outlet conduit opening into the top of an enlarged conduit section of said pebble outlet conduit, which said enlarged pebble conduit section is formed as an excentric and the upper portion of said pebble outlet conduit opening into the top portion of said enlarged conduit section at the side from which said sifter slopes downwardly; a sifter, positioned in said enlarged portion of said pebble conduit, comprising a plurality of parallel bars spaced apart so as to permit free flow of pebbles therethrough while preventing flow of large chunks of solid material therethrough, said sifter being disposed at an angle of between 10° and 18° from the horizontal, extending downwardly and in a direction away from the pebble outlet conduit portion which opens into the top of said enlarged conduit section; a coke port in the upper portion of said enlarged conduit section at the side toward which said sifter extends downwardly; and an elevator connected to said pebble outlet conduit, downstream of said sifter, and to said pebble inlet means to said first chamber.

References Cited in the file of this patent

UNITED STATES PATENTS

| | | |
|---|---|---|
| 2,290,580 | Degnen et al. | July 21, 1942 |
| 2,412,136 | Evans et al. | Dec. 3, 1946 |
| 2,486,627 | Arnold | Nov. 1, 1949 |
| 2,493,672 | Johnson | Jan. 3, 1950 |
| 2,493,784 | Strader | Jan. 10, 1950 |
| 2,561,420 | Schutte | July 24, 1951 |